C. D. SCHMIDT.
ANTISKID DEVICE FOR VEHICLE WHEELS.
APPLICATION FILED FEB. 3, 1919.
1,347,524. Patented July 27, 1920.
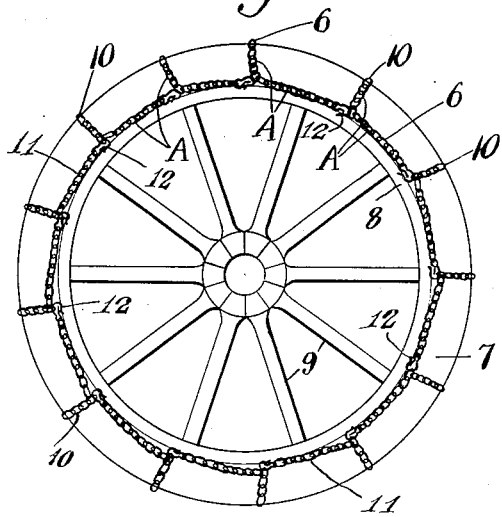
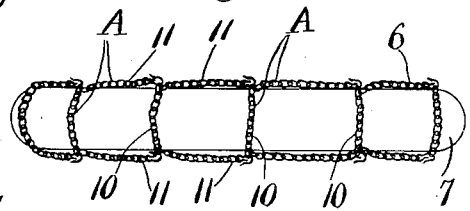
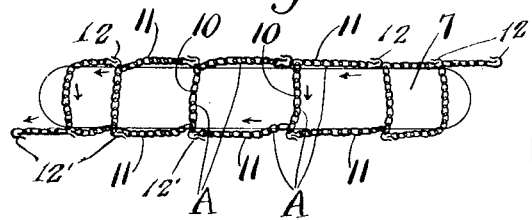
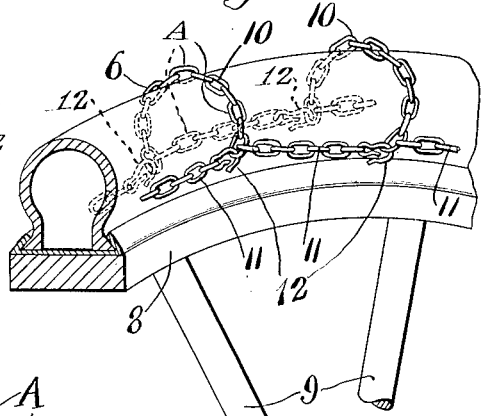
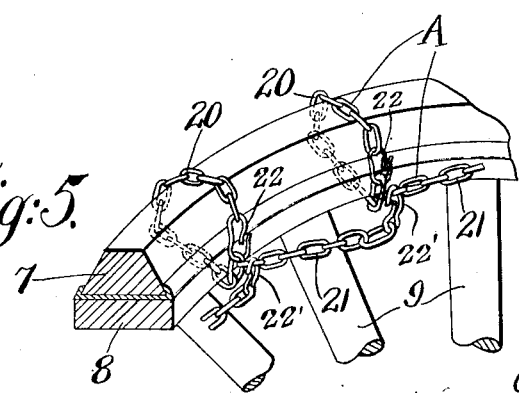
Inventor
Charles D. Schmidt
By his Attorneys
Edwards, Sager & Richmond

UNITED STATES PATENT OFFICE.

CHARLES D. SCHMIDT, OF JAMAICA, NEW YORK.

ANTISKID DEVICE FOR VEHICLE-WHEELS.

1,347,524.   Specification of Letters Patent.   Patented July 27, 1920.

Application filed February 3, 1919. Serial No. 274,592.

*To all whom it may concern:*

Be it known that I, CHARLES D. SCHMIDT, a citizen of the United States, residing at Jamaica, Long Island, in the county of Queens and State of New York, have invented certain new and useful Improvements in Antiskid Devices for Vehicle-Wheels, of which the following is a specification.

This invention relates to anti-skid devices for use on vehicle wheels and particularly to such devices providing a series of cross pieces around the periphery of the wheel tread. The object of the invention is to provide such an anti-skid device built up from unit sections hooked together in succession around the wheel tire.

Another object of the invention is to provide a combination of the unit parts such that the same units may be used for different sizes and types of wheels and tires.

Further objects of the invention will appear in connection with the following description taken with the accompanying drawings in which—

Figure 1 is a side elevation of a wheel provided with an anti-skid device made in accordance with this invention;

Fig. 2 is an edge view of the wheel of Fig. 1;

Fig. 3 is a view similar to Fig. 2 showing a modification of the invention;

Fig. 4 is an enlarged view in perspective of a portion of Fig. 1, and

Fig. 5 is a perspective view of a wheel illustrating a further modification of the invention.

In the specific embodiment of the invention in Fig. 1, the anti-skid device 6 is shown in place on the tire 7 of a wheel 8 having spokes 9. The device 6 is preferably of chain and has cross pieces 10 extending transversely across the periphery of the tire and side pieces 11 on each side connecting the cross pieces. The device as a whole is made up of a succession of similar units A having a hook 12 at each end and combined together so that each cross piece 10 is an intermediate portion of an element A and side pieces 11 are the ends of said element. The cross pieces form the anti-skid tread and the side pieces form rings continuous on each side connecting all the cross pieces.

The complete device is originally formed by assembly of its elements to fit the particular wheel for which it is intended. An element A, a single chain length, is laid on the tire one half on each side and the ends may for convenience be hooked through between spokes to hold this first section in place. The second section is then placed with its center on the tire and attached by hooks 12 at its ends 11 to intermediate portions on each side of the first section and subsequent sections are similarly attached in sequence until the circle is completed and the final section attached to the ends of the first section.

In the modification shown in Fig. 3, the respective ends of each section instead of being both attached to the prior section are carried in opposite directions from the cross piece 10, one being carried forward and hooked by a hook 12 to the preceding section and the other being carried rearward and hooked by hook 12' to the next succeeding section as indicated by arrows. In Fig. 3 the chain at each extreme end is detached and the end carried horizontally outward to illustrate the formation. In each of these modifications rings are formed on each side of the wheel by the connected ends 11 and the whole anti-skid device is fitted to the individual tire by the simple assembly of its elements. The anti-skid devices of Figs. 1 to 4 will be free to creep around the tire in use; but where this creeping is undesirable fastening means may be added to anchor the chain, for instance, by passing an extra section through the spokes and fastening its ends to the assembled units.

In the modification shown in Fig. 5 and particularly adapted for truck wheels the cross pieces 20 are formed by completely looping a portion of each section A around the tire and through the spokes and forming a single retaining ring by connecting the remaining ends 21 in sequence to each other by hooks 22'. In this construction all the loops are fastened together so that the hooked ends will be retained at the inner periphery and will not be mutilated by reaching the tread and a break in any point will not lose any of the parts.

The anti-skid device of this invention being built up of a number of similar units, it is unnecessary to make a separate chain for each different size and type of wheel and tire. Variations in sizes may be accommodated simply by varying the number of sections and particularly with the Fig.

5 form each unit when worn at one part may be readjusted in the combination to position another unworn part across the tread, thus distributing the wear and greatly increasing the life of the chain. A break at any point may be easily and quickly repaired by having on hand an extra section. The tire chain may be assembled on the wheel without jacking up the wheel or moving the car and once assembled the chain may be retained in this condition only releasing such hooks as are necessary to most conveniently detach it.

I claim:—

1. The combination with a vehicle wheel, of an anti-skid device therefor composed of a series of similar chain sections with hooks at their ends, said assembled section forming retaining rings of less diameter than the tread of said wheel at each side thereof, and a series of cross chain elements extending over the wheel tread from the ring on one side to the ring on the other, said device being attachable to the wheel without deflation of the tire thereof.

2. An anti-skid device for a vehicle wheel, comprising a series of similar chain lengths having their intermediate portions crossing the tire tread and their end portions detachably hooked to the next adjacent lengths so as to form continuous rings connecting said intermediate portions and of less diameter than said wheel.

3. An anti-skid device for a vehicle wheel comprising a series of similar chain elements crossing the tire tread and having their end portions hooked to the intermediate portion of each next adjacent element so as to form continuous annular retaining means connecting said cross elements and of less diameter than said wheel.

4. An anti-skid device for a vehicle wheel comprising a set of similar simple chain-lengths with quick detachable fasteners at their ends, said chain lengths being assembled on the wheel so that the intermediate portion of each such chain length lies across the wheel tread and the end portions lie along the sides of the rim and are connected together to form side rings with the said intermediate portions branching therefrom.

5. An anti-skid device for a vehicle wheel comprising a set of chain lengths with quick detachable fasteners connected thereto, said lengths being assembled on the wheel and fastened to the adjacent lengths so that certain corresponding parts thereof form a ring around the wheel and other corresponding parts thereof form respective cross members passing completely across the wheel tread.

CHARLES D. SCHMIDT.